April 28, 1970  E. J. GRABAU  3,508,826

POINT EXPANSION SYSTEM

Filed Oct. 3, 1966  2 Sheets-Sheet 1

DRAWING
STEP 1

NEGATIVE
STEP 2

EXPANDED
PATTERN
(POSITIVE)
STEP 3

EXPANDED
PATTERN
(NEGITIVE)
STEP 4

INVENTOR.
EARL J. GRABAU

BY Robert G Rogers
ATTORNEY

April 28, 1970     E. J. GRABAU     3,508,826

POINT EXPANSION SYSTEM

Filed Oct. 3, 1966     2 Sheets-Sheet 2

*INVENTOR.*
EARL J. GRABAU

BY *Robert E. Rogers*

ATTORNEY

United States Patent Office 3,508,826
Patented Apr. 28, 1970

3,508,826
POINT EXPANSION SYSTEM
Earl J. Grabau, Manhattan Beach, Calif., assignor to North American Rockwell Corporation, a corporation of Delaware
Filed Oct. 3, 1966, Ser. No. 583,512
Int. Cl. G03b 27/32
U.S. Cl. 355—18                   1 Claim

ABSTRACT OF THE DISCLOSURE

A photographic printing system including a cam driven plate for rotating a circuit pattern relative to a fixed photosensitive recording medium in a camera while exposing the medium to light through the pattern. The camera has an adjustable objective lens which preselectively increases or decreases the degree of enlargement of the projected image. All points of the pattern are expanded on the medium as a function of both the type and amount of cam movement and the degree of enlargement.

---

This invention relates to a system for expanding recorded information comprising at least one point and, more particularly, to such a system for expanding the dimensions of information by effecting movement of the information in a pattern relative to a recording medium.

Although a point expansion system may have many applications, one application is in the production of circuit boards. Many circuit board processes require preparation of a negative which contains the pattern to be ethced from the conducting layer of the circuit board. The circuit layout showing conductor paths may initially be drawn in pen or pencil on a relatively large sheet of paper material. Usually, the initial layout is drawn several times larger than the actual size of a circuit embodiment to increase the accuracy of the layout.

Subsequently, a duplicate of the initial, or preliminary, layout may be prepared by applying an opaque adhesible material such as black tape to a translucent sheet such as Mylar. The tape is centered on the conductor paths of the preliminary layout and is of sufficient width to allow for later photographic reduction to a desired pattern size. The tape-up operation consumes considerable time and must be done with precision in order to assure an accurate reproduction of the original layout.

A negative and/or positive (depending on the anticipated etching and plating methods to be used) is then made from the taped layout and used in the process for fabricating circut boards. For example, a circuit board surface is coated with a photo-sensitive substance and exposed to radiation through a negative. The surface is thereby masked according to a desired circuit pattern. Subsequently, the unexposed board surface, usually copper cladding, is etched to form the circuit pattern.

Tape-up errors are difficult to detect and correct. The quality of the board is easily affected because of the difficulties in maintaining close tolerances due to the many manual operations. The dimensions of the circuit may inadvertantly be changed because different persons are performing the manual operation or because of human inconsistencies.

It would be desirable to be able to expand each point of the preliminary layout without the necessity of the taping operation. A circuit board could be fabricated more quickly and with greater reliability. Also, because of the increased efficiency, the costs involved may be reduced considerably.

The present system comprises means for expanding the points or line widths of a preliminary circuit layout without the requirement of the taping operation. The difficulties inherent in the existing processes are thereby minimized.

Briefly, the system includes means for effecting movement of the circuit patttern relative to a photographic recording medium. For example, a photographic plate may be exposed to the circuit pattern comprising lines, terminal areas, etc. while all parts of the pattern are benig rotated in a circular path. Either the photographic plate or the pattern could be rotated relative to each other, or both could be rotated simultaneously. In other embodiments, lens may be interposed between the pattern and the recording medium to simulate movement of one or the other and thereby create the effect of relative motion between the pattern and the recording medium.

As the pattern rotates relative to the plate, the photographic impression made on the plate is an expansion of the lines, etc., comprising the original layout by an amount proportional to the radius of the circuit movement. Movements other than circular movements may be used to produce various expansion patterns. Subsequently, the photograph is developed and a positive and/or negative is produced as required. Afterwards, the process is continued in accordance with existing techniques.

Therefore, it is an object of this invention to provide a system for eliminating the taping step of circuit board fabrication processes.

It is another object of the invention to provide means for improving the efficiency of preparing negatives and/or positives for use in fabricating circuit boards by producing the negatives and/or positives directly from preliminary circuit layous.

It is still another object of the invention to increase speed and improve reliability of a negative and/or positive embodying a circuit pattern by producing the negative and/or positive directly from an original circuit pattern.

It is still a further object of the invention to provide a means for producing a negative and/or positive embodying a circuit pattern by expanding the dimensions of a preliminary circuit pattern by effecting rotation of the pattern relative to a photographic plate.

Another object of the invention is to provide a system for rotating a circuit pattern layout relative to a photographic medium to expand the lines comprising the circuit pattern.

A still further object of the invention is to provide a system for expanding points comprising recorded information by rotating the points relative to a recorded medium.

These and other objects of this invention will become more apparent in connection with the following drawings of which, FIGURE 1 shows one embodiment of a sequence of steps used in producing an expanded circuit pattern.

Figure 1:
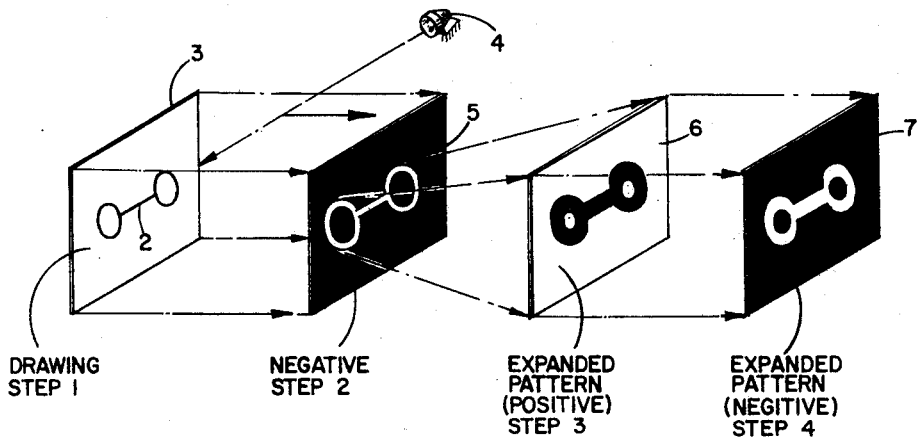

Referring now to FIGURE 1, wherein is shown a portion of a preliminary circuit layout, or drawing, comprising a single conductor line 2, including terminal areas recorded on sheet 3. Although a simple pattern is shown, it should be obvious that a more complex and different pattern could also be recorded. Usually, a pen or pencil is used in recording the preliminary layout on a sheet of paper. The pattern has the dimensions of the pen or pencil mark made on the sheet. In other words, the width of the lines comprising the pattern is approximately the same as the width of the pen or pencil point making the line.

In one embodiment, the sheet may be opaque while in others, the sheet may be transparent, depending on the particular requirements and equipment available for use.

For the embodiment shown, light source 4 illuminates the layout and causes light 1 reflected from the layout to expose a photo-sensitive film. The exposed film is used to produce negative 5 of the same or reduced scale as shown in step 2. A reduced scale permits smaller equipment and smaller film size to be used. The negative has a reversal in transparency from drawing 3. In the negative, the line pattern is transparent as contrasted with opaque in sheet 3.

The method of developing a negative transparency by exposing a photo-sensitive film not in a camera is often described as the contact method. However, a camera can be used, as described above, in lieu of the contact method to produce the negative. If a camera is used, a reduced scale can be obtained.

A camera can also be used to produce differing reversal transparencies. For example, if different colored lines are used on the original layout (step 1) and filters are used on the camera lenses (step 2), various colors can be dropped in the process of producing negatives to insure positive indexing of double sided boards. Ordinarily, transparent sheets (step 1) are used in the color dropping process where indexing is desired to permit light to pass through the sheet as contrasted with being reflected from the sheet.

It is possible, however, to use either a transparent sheet or an opaque sheet for both processes. Generally, a transparent sheet is used in the color dropping or contact method and an opaque or translucent sheet is used with the reflected light method.

The pattern of negative 5 is next expanded and the transparencies are against reversed in step 3. In other words, in expanding pattern 2, the opaque areas of negative 5 become transparent and the transparent areas, comprising pattern 2, become opaque. Positive 6, as distinguished from a negative, is produced.

Expansion of the pattern from a negative type image to a positive type image may be affected by a plurality of means. For example, negative 5 may be secured to a frame which can be actuated to move about a geometric pattern such as a circle, rectangle, elipse, etc. During the motion, light is transmitted through the negative to expose film in a camera or contact film. The pattern is expanded on the film by an amount proportional to the type and effective radius of the geometric pattern.

In other embodiments, the negative may be fixed and the film in the camera or the contact film, may be caused to move while being exposed by the light.

In still another embodiment (see FIGURE 3), the motor means connected to move the frame or the film, may instead be connected to move a lens combination. As the light is transmitted through the negative and the lens, during the exposure, the pattern is moved in the plane of the film as though either the film or the negative were being moved.

In addition, a simple embodiment may comprise moving a negative in a plane parallel to the surface plane of a photo-sensitive material deposit (resist) on the surface of a circuit board. The photo-sensitive material is exposed to light through the moving negative and unexposed resist is washed away. The exposed areas are an expansion of the pattern of the negative. The exposure of photo-sensitive material on the circuit board surface replaces the positive expansion pattern 6 as shown in FIGURE 1. Obviously, the circuit board may be moved instead of the negative, or a lens system may be utilized to obtain the effect of relative movement between the negative and the photo-sensitive material in the circuit board.

In step 4 the areas of transparency are again reversed to produce negative 7. The negative may then be used to expose photo-sensitive material on a circuit board surface in processes known in the art for producing circuit boards. Step 4 may be omitted, however, if the process described for expanding the pattern in the photo-sensitive material directly on the board surface is used. Also, step 4 may be eliminated if positive type film is substituted for the negative normally used in step 3.

Figure 2:
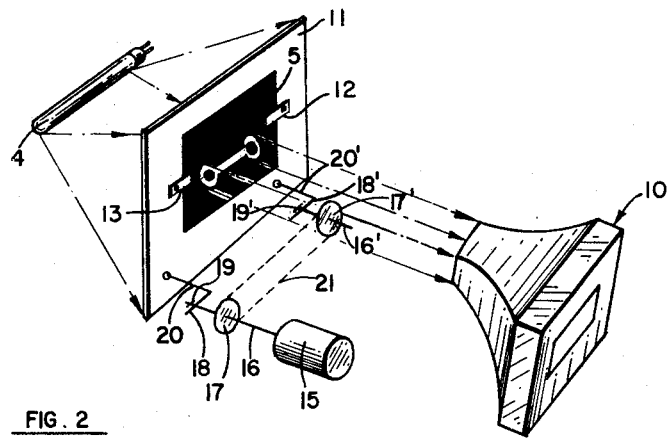
FIGURE 2 shows one embodiment of a system for expanding the lines comprising a circuit pattern.

Referring now to FIGURE 2, wherein is shown one embodiment of a system for moving negative 5 in a circle with respect to film in camera 10 to produce positive 6 (see FIGURE 1) having a pattern representing an expansion of the pattern shown on negative 5.

Negative 5 is secured to frame 11 by clamping means 12 and 13. Frame 11 for the embodiment shown, is comprised of transparent ground glass. Light 1 is provided by source means 4 positioned behind the frame means. Camera 10, including light sensitive film, is positioned for receiving the light from source means 4 after it has passed through the negative 5.

Drive means 14 comprises motor 15 and gears 17 and 17' for rotating the frame. Shaft 16 interconnects the motor and gear 17 and also extends through the gear to cam member 18. The cam member is equipped with adjustment means 19, such as a lock nut for changing the distance R from shaft 16 to drive shaft 20. By changing the distance R, the radius of the circular motion may be changed and the amount by which the pattern is expanded is also changed.

Although circular motion is generated by the drive means of FIGURE 2, by changing the cam and gear combination, other motions such as eliptical, rectangular, etc., may be generated.

Cam member 18' is connected for simultaneous rotation with cam member 18, by means of slotted belt 21 which meshes with the teeth of gear 17. The belt also meshes with the teeth of gear 17' which is connected to cam member 18' by shaft means 16'. The cam also includes adjustment 19', for changing the radius R' from shaft 16' to the drive shaft 20'. Radii R and R' are equal for a given setting.

In operation, the negative comprising a circuit pattern is secured to the frame and is illuminated by light source 4. Before exposing the film (not shown) inside the camera, motor 15 is actuated to cause the frame and the negative to move in a circular pattern having radius R. The speed of the motor may vary depending on the particular requirements, but 10 revolutions per minute is adequate to coordinate pattern expansion with camera exposure time and lens openings (F setting). Exposure time is dependent, to a certain extent, on the intensity and distribution of the light from the source.

An exposure of 30 seconds is an example of an acceptable exposure time using a fluorescent light source at a camera setting of F22 and a motor speed of 10 r.p.m.'s. In the event the motor rotation is increased in speed, it may be necessary to change the exposure time and the setting of the camera. The smoothness of the edges of the lines on the expanded pattern is somewhat dependent on the camera settings and the speed of the motor. As a result, preliminary tests may be required for various speeds, settings, etc. in order to achieve optimum values.

It has been determined that slight irregularities existing in a preliminary layout such as a broken or wavy line, incompleted terminal areas, and similar irregularities are eliminated in the final expanded pattern.

Figure 3:
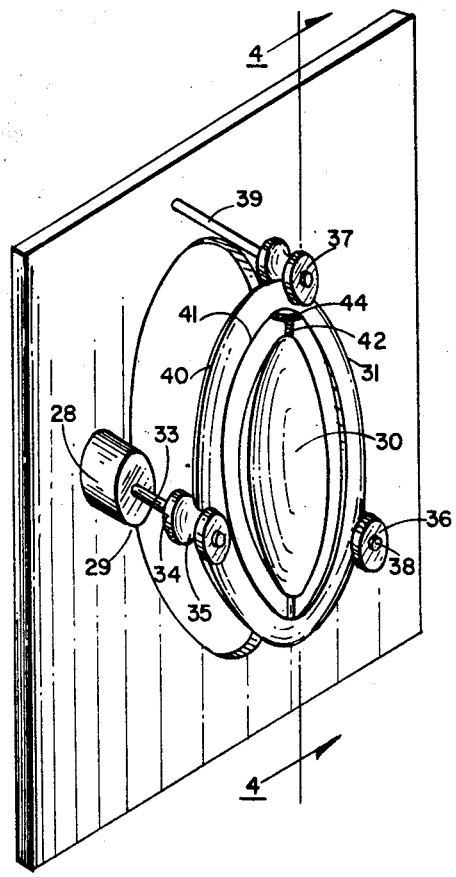
FIGURE 3 shows a second embodiment of a system using lens to effect relative movement between a circuit pattern and a recording medium.

Referring now to FIGURE 3, wherein the motor drive means 29 is connected to lens means 30 for imparting a motion to the lens means to effect circular movement of the circuit image shown in negative 5 in the plane of the film contained in camera 10 (see FIGURE 2). The camera and the negative are fixed relative to the lens means. As the motor imparts motion to housing 31, the image appearing at the face of the lens is caused to expand on the film (not shown). In effect, relative motion between the camera and negative is simulated.

The drive means includes motor 28 connected by shaft 33 to gear 34. The motor is secured to frame 32. Gear 34 is provided with groove 35 into which wedge shaped edge 40 of the housing means 31 inserts. The housing is shown in a circular configuration, although other configurations could also be used to achieve different patterns of expansion.

The drive means also comprises idler gears 36 and 37 provided with grooves which mate with the edge of housing means 31. The gears rotate on shafts 38 and 39 respectively, which are rotatably affixed to frame 32.

Lens 30 is secured within opening 41 of housing 31 by holder means 42 and 43. Holder 42 includes an adjustment means 44 which permits the lens to be rotated and fixed in a plane directed at an angle with respect to the planar surfaces of both the photo-sensitive plate and the circuit pattern. In one embodiment, the holder may comprise spring loaded and rotatable pin which includes a grooved head portion for mating with the edge of the lens.

The adjustment means may comprise a portion of the pin which has a diameter larger than the body of the pin for easier gripping.

In other embodiments, the holders may comprise threaded pins with grooved head portions which can be tightened or loosened to accommodate the lens and to permit rotation of the lens in a horizontal plane.

Figure 4:
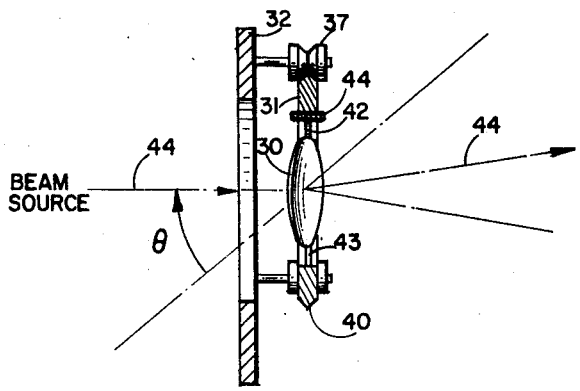
FIGURE 4 is a sectional view of the FIG. 3 embodiment.

In operation, as shown in FIGURE 4, the lens is initially rotated by an angle in a horizontal plane. The angle determines the amount of expansion of the pattern on the film. Subsequently, when the motor is actuated, the housing means rotates in a circular path and lens rotate in a circular path askewed from the circular path of the housing means. As a result, the image transmitted by beam 44 is expanded by an amount proportional to the angle.

Although the lens is shown as having only one degree of adjustment, other configurations could be designed to include a plurality of rotation adjustments in various planes. The type of expansion pattern desired determines the degree and type of lens rotation.

The FIGURE 3 embodiment shows means for adjusting the lens in order to achieve an expansion angle. In other embodiments, the frame, housing or a combination of the frame, housing and lens could be fitted with angle adjust means to achieve various expansion patterns.

Although the invention has been described and illustrated in detail, it is to be understood that the same is by way of illustration and example only, and is not to be taken by way of limitation; the spirit and scope of this invention being limited only by the terms of the appended claim.

I claim:
1. A system for expanding and changing the scale of a circuit pattern, said system comprising
 a drawing embodying a circuit pattern, a camera having an adjustable objective lens means and means for preselectively incresing or decreasing the size of the projected image,
 a photographic plate in said camera,
 a light means disposed relative to said drawing for exposing the photographic plate in the camera to the circuit pattern for recording the circuit pattern on the photographic plate,
 means for affecting rotation of the drawing relative to the camera for expanding the dimensions of said circuit pattern by an amount proportional to the relative rotation between the drawing and the camera,
 said camera being positioned apart from said drawing at a predetermined distance for changing the scale of the circuit pattern on the drawing to a different scale on the photographic plate.

References Cited

UNITED STATES PATENTS

| | | | |
|---|---|---|---|
| 2,607,268 | 8/1952 | Bartz | 88—24 |
| 2,776,595 | 1/1957 | Schumacher | 88—24 |
| 2,870,010 | 1/1959 | Sadowsky et al. | 88—24 X |
| 3,233,509 | 2/1966 | Swiggett | 88—24 |
| 2,144,066 | 1/1939 | Kindermann | 96—44 X |
| 2,286,883 | 6/1942 | Weber | 96—44 X |

NORTON ANSHER, Primary Examiner

R. A. WINTERCORN, Assistant Examiner

U.S. Cl. X.R.

95—85; 96—42, 44; 355—40, 79